Sept. 26, 1967      I. C. PORTER      3,343,623
AUTO-LOCK SEAT BELT
Filed Aug. 9, 1965
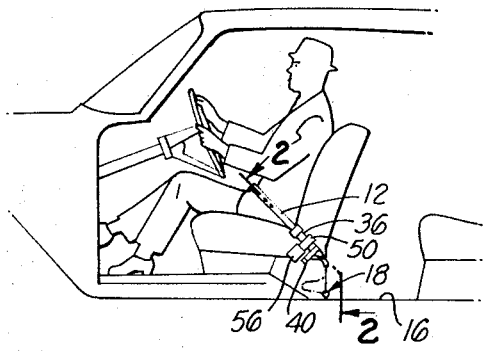
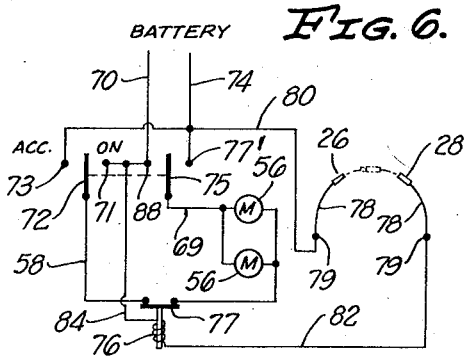
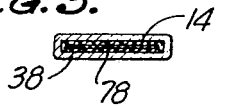
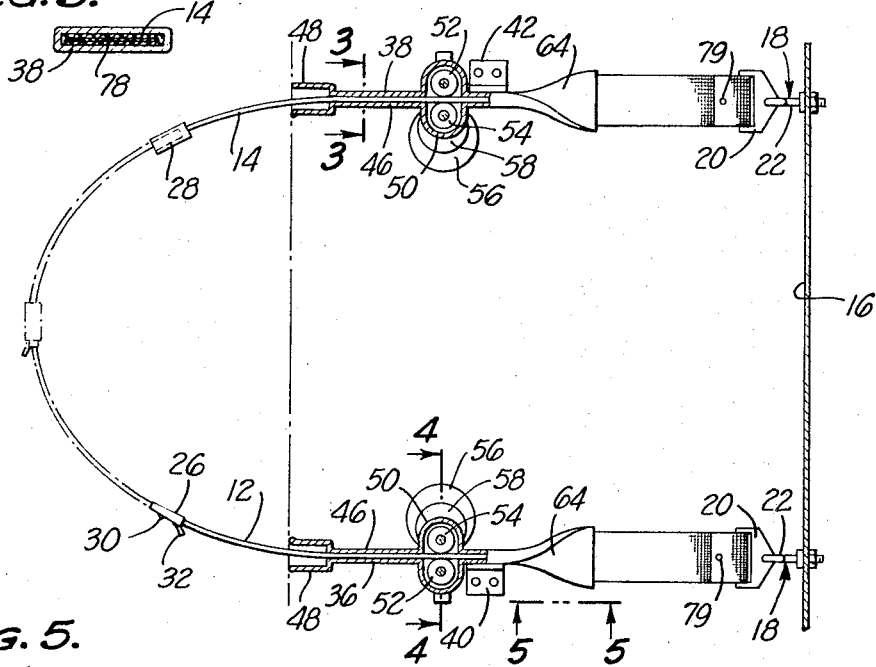
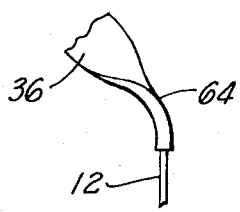
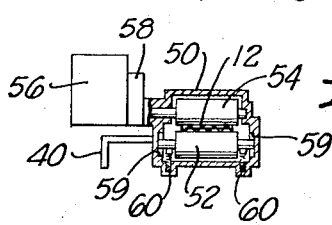
INVENTOR.
IRWIN C. PORTER
BY HIS ATTORNEYS
HARRIS, KIECH, RUSSELL & KERN United States Patent Office 3,343,623
Patented Sept. 26, 1967

3,343,623
AUTO-LOCK SEAT BELT
Irwin C. Porter, Quinter, Kans. 67752
Filed Aug. 9, 1965, Ser. No. 478,122
7 Claims. (Cl. 180—82)

ABSTRACT OF THE DISCLOSURE

A seat belt arrangement including two halves anchored to the structure of an associated vehicle and having retracted positions to provide a substantially clear seat. Preshaped stiffening means in the seat belt halves cause the halves to curve about the waist of the occupant of the seat as they are ejected by power units from their retracted positions.

---

This invention relates to improvements in seat belt systems.

Seat belts for vehicular travel, automotive and air, are widely recognized as a wise precautionary measure. It is estimated that automotive seat belts are probably used less than half of the time, this being especially true for short trips from the home. Data of the National Safety Council has established that by far the vast majority of automotive accidents occur within a few miles of the home and it is in this area where the normal car occupant is most careless in the use of his seat belt. The use of the conventional seat belt calls for a conscious act on the part of the vehicle occupant. It is dependent upon him to remember to pick up the loose ends of the seat belt straps and couple them together by a conscious manual act. There is no automatic means in conventional seat belt systems for either automatically locking the belt ends together or for automatically inciting the occupant into action.

It is a principal object of this invention to provide a seat belt mechanism which is capable of automatically locking the occupant in his seat.

It is a further object of the invention to provide a seat belt mechanism having means for ejecting the seat belt automatically from its retracted position with closing of the ignition switch.

It is a still further object of the invention to provide a seat belt mechanism wherein power means are provided for ejecting and retracting the seat belt.

In the improved seat belt mechanism of the invention, at least one of the two belt halves and preferably both are held in a retracted position when not in use. Means is provided for ejection of the seat belt from its retracted position, this normally being achieved in the instance of an automobile by the closing of the ignition switch. It will be appreciated that the ejecting means could be activated by the closure of a toggle switch apart from the ignition switch. The latter arrangement is more especially suited to air travel where the pilot preceding takeoff of the aircraft and following seating of the passengers would close a toggle switch to assure that all of the seat belts have been buckled. In the instance of the automobile, the activation of the ejection means will most desirably occur with the closure of the ignition switch since this arrangement does not require a conscious act on the part of the occupant and will assure that the seat belt is locked before movement of the car occurs. A separate circuit operated by a toggle switch may be provided to override the automatic ejection circuit for use in those instances where seat belt protection is not desired.

The seat belt mechanism of the invention need not necessarily automatically buckle the two belt halves together, although this does occur in a preferred embodiment of the invention, but the seat belt mechanism may be simply employed to provide a means for either partially or completely ejecting the seat belt halves from their retracted positions with the actual buckling or coupling of the two halves together being accomplished manually by the occupant once his attention has been drawn to the ejected belt. The fact that the belt halves have been automatically propelled from their normal retracted position will suffice to draw the seat occupant's attention to their presence and need of buckling.

Where the device is designed for automatically encircling the occupant's body, the seat belt halves will be respectively formed to take colliding paths upon the ejection from suitably oriented retracted locations to a locked position about the waist of the occupant. Normally, the seat belt halves in this application will have elongated, preshaped stiffening staves, preferably in the form of a spring steel, disposed within a fabric structure which is conveniently made of braided nylon. It this form of the device of the invention, the motors propelling the respective belt halves may be inactivated by the completion of a circuit achieved with the coming together of the buckle means carried by the respective belt halves.

In the preferred form of the seat belt mechanism of the invention, concealed ejection tubes are located on either side of the seat occupant and a separate motor is associated with each tube for propelling a seat belt half therethrough. The seat belt halves are driven respectively between an idler and powered friction roller activated by the electric motor which causes the respective belt halves to be ejected or to be retracted through the tube member. The respective braided nylon seat belt halves with the preshaped steel staves therein takes a predetermined contour path after leaving the mouth of the ejection tube. At the end of the travel in the preferred embodiment, the seat belt halves meet and their respective buckling means automatically lock, breaking the circuit to the electric motors which were previously energized by turning on the ignition switch or other switching means.

These and other objects and advantages of the apparatus of the invention will become more apparent in view of the following specification taken together with the drawings.

FIG. 1 is a utility view in side elevation with the door of an automobile removed to more clearly illustrate the use of the seat belt mechanism of the invention;

FIG. 2 is a sectional view taken along line 2—2 of FIG. 1;

FIG. 3 is an enlarged cross-sectional view taken along line 3—3 of FIG. 2 illustrating the cross-section of an ejection tube of the invention with a seat belt half located therein;

FIG. 4 is a cross-sectional view, partly in elevation, illustrating in detail the roller system used for propelling the seat belt through the ejection tube;

FIG. 5 is a fragmentary side elevational view taken along line 5—5 of FIG. 2 illustrating the twist incorporated in the ejection tubes for changing the direction of the seat belt in passing therethrough; and FIG. 6 is a circuit diagram of an electrical system that may be employed for the operation of the seat belt mechanism of the invention.

A preferred installation is illustrated in the drawings and reference to FIGS. 1 and 2 will show that the respective ends of the two seat belt halves 12 and 14 are anchored in a conventional fashion to a floorboard 16 of an automobile through a typical anchoring assembly 18 comprising an anchoring bracket 20 and bolt 22. The seat belt halves 12 and 14 at their free ends are provided with mating coupling or buckling means 26 and 28. Various forms of buckling means may be employed but in the instance where the device is intended to automatically latch, the means selected should, of course, be capable of engagement without manual assistance. In the particular arrangement illustrated, a latch means 30 of the male buckling means 26 engages a complementary portion of a female buckling means 28. At time of disengagement of the buckling means, a latch release member 32 is depressed which causes latch means 30 to disengage, permitting separation of the two buckle halves by the occupant. In the instance where the device is not designed to automatically couple, following ejection of the seat belt halves 12 and 14, the buckling is achieved manually by the seat occupant. It will also be appreciated that in the event buckling means 26 and 28 illustrated in the drawings fail to automatically lock, the locking may be achieved manually.

In the particular system illustrated, ejection tubes 36 and 38 are disposed on opposite sides of the seat occupant and held by brackets 40 and 42 to the seat structure. With reference particularly to FIGS. 2 and 5 it will be seen that the ejection tubes 36 and 38 comprise an elongated straight segment 46 of rectangular cross-section which at its outer end expands into a receiving cup portion 48. The respective ejection tubes 36 and 38 intermediate their length and immediately adjacent the straight segment 46 have an enlarged housing portion 50 in which there is rotatably mounted (FIG. 4) an idler roller 52 and a drive roller 54 which latter roller is driven by a motor 56 through a gear box 58. The respective seat belt halves 12 and 14 are located between the rollers 52 and 54. The idler roller 52 of each drive mechanism floats in slots 59 and is biased by two springs 60 into engagement with the seat belt.

Rearwardly of the housing 50 of each of the ejection tubes 36 and 38 there is a down turned and twisted portion 64 of the tube which changes the plane of the seat belt in the embodiment illustrated, approximately 90° from the plane of the belt within the straight segment 46 at the forward end of the respective tubes. The twisted and downward portion 64 directs a portion of the seat belt adjacent the anchoring assembly 18 beneath the seat with the belt in its retracted position. For illustration purposes a small portion of the belt is shown in phantom line under the seat in FIG. 1 but normally the belt in its extended, locked position will be substantially taut with no portion beneath the seat. The tautness of the belt and the closeness with which it encircles the waist of the seat occupant, may be adjusted by movement of the seat forward and backwards to provide the desired degree of tightness. The respective belt halves or a single one of them may be provided with a belt takeup means of conventional form immediately adjoining the anchoring assembly 18.

The seat belt as illustrated is formed to take a path upon ejection about the waist of the seat occupant. Preferably this is done by incorporating an elongated, preshaped stiffening stave 78 (FIG. 3) in the respective belt halves 12 and 14. In the particular embodiment illustrated, the stiffening means is a preformed steel stave which is incorporated centrally of a braided nylon fabric structure. Proper orientation of the two ejection tubes 36 and 38 together with the correct preshaping of the stiffening staves is required for successful automatic buckling. The downward twisted portion 64 of the respective ejection tubes 36 and 38 is bent in the same direction as the set of the respective belt staves to minimize friction. The stiffening means also facilitates the ejection of the seat belt halves 12 and 14 from their respective ejection tubes whether or not automatic buckling is a feature of the particular system. It will be noted on reference to FIG. 2 that the twist of the downwardly turned portion 64 of the respective ejection tubes 36 and 38 are in opposite directions.

The interior walls of the straight segments 46 and the downfardly turned portions 64 of the embodiment illustrated slidably engage the belt halves 12 and 14 but this is not an essential feature and in some instances it may be found desirable to provide more clearance to minimize friction.

It will be appreciated that various electrical circuits may be employed for the operation of the seat belt mechanism of the invention, the particular circuitry employed will depend among other things upon the degree of automation desired. A representative circuit is illustrated in FIG. 6. There it will be seen a wire 70 from one pole of a battery connects with the on-terminal 71 of a modified ignition switch which incorporates a double-throw, double-pole switch having a usual blade 72 movable between the on-terminal 71, an off position, and an accessory terminal 73. A second blade 75 of the modified ignition switch moves between a terminal 77' connected through a wire 74 to the other side of the battery and a second terminal 88 which connects through the lead 70 to the battery. The blade 75 also has a central off position. The battery connects through the aforementioned lead 74 and lead 69 to two motors 56 which are in parallel. The blade 72 of the ignition switch is joined to the motors 56 via a lead 58. It will thus be seen that with closing of the ignition switch 72 to the on position of terminal 71, the motors 56 are energized bringing about the ejection of the respective belt halves 12 and 14 which move on collision paths and eventually automatically lock as illustrated in phantom lines. In the embodiment illustrated the motors 56 are deactivated through completion of a circuit which energizes a solenoid 76 of a relay 77 that opens the motor circuit 70, 58, 69, and 74. More particularly, the steel staves 78 of the seat belt halves 12 and 14 are connected through an appropriate circuit to the battery and upon closing of the buckle members 26 and 28, current is supplied to the solenoid 76. The steel staves 78 form a portion of the foregoing circuit with a terminal 79 of one of the staves adjacent the anchored end of the belt connecting through a line 80 to one side of the battery. Terminal 79 of the stave 78 of the other belt half is joined through wire 82, the solenoid 76, and leads 84 and 70 to the other side of the battery. The relay 77 is spring loaded to its closed position and normally closes line 58 to the motors 56 but with energizing of the solenoid 76 the relay 77 opens the circuit to the motor 56.

It is a desirable feature of the seat belt mechanism of the invention that in order to energize the motors 56 to bring about retraction of the seat belt halves 12 and 14 that there be a conscious act on the part of the seat belt occupant and this comprises the actual opening and separating of the seat belt buckling means 26 and 28 by the occupant. When this occurs, the solenoid 76 is de-energized and the relay 77 returns to its closed position and with movement of the modified ignition switch to its accessory position where blade 72 engages the terminal 73 and the tied-in blade 75 moves into engagement with terminal 88, there is a completion of a circuit to the motors 56 with the motors in this instance being joined in an opposite direction across the battery than in the instance where the switch connects through terminals 71 and 75. Thus, current is provided in a reverse direction to the motors 56 and the motors retract the seat belt halves 12 and 14 into the cup receiving portions 48 of the respective ejection tubes 36 and 38. When the belts have been retracted, the ignition is turned to its off position.

It will be appreciated that other circuits may be employed to eject and retract the seat belt and that the circuits may be used to simultaneously control the movement of several seat belt systems incorporating the features of the invention.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:
1. An improved seat belt arrangement for holding an occupant in a seat of a vehicle comprising:
   a seat belt having two halves anchored respectively to the structure of the vehicle and adapted to fit about the waist of the seat occupant with the free ends of the two belt halves releaseably coupled together;
   said seat belt halves having retracted positions to provide a substantially clear seat;
   power drive means for ejecting the seat belt halves from their respective retracted positions; and
   said seat belt halves including stiffening means preshaped to curve said halves about the waist of the seat occupant as ejected from said retracted positions.

2. An improved seat belt arrangement for holding an occupant in a seat of a vehicle comprising:
   a seat belt halving two halves anchored respectively to the structure of the vehicle and adapted to fit about the waist of the seat occupant with the free ends of the two belt halves releaseably coupled together;
   said seat belt halves having retracted positions within the vehicle structure to provide a substantially clear seat;
   means for ejecting the seat belt halves from their respective retracted positions said ejection means including power means and ejection tubes; and
   said seat belt halves being respectively formed to take a path upon ejection about the waist of the seat occupant and having a fabric structure with an elongated, preshaped stiffening stave located therein.

3. An improved seat belt arrangement comprising:
   a seat belt having two halves anchored respectively to the structure of the vehicle and adapted to fit about the waist of the seat occupant with the free ends of the two belt halves releaseably coupled together;
   said belt halves having retracted positions to provide a substantially clear seat;
   coupling means carried by the respective belt halves adapted to automatically engage and couple;
   power drive means for ejecting the seat belt halves from their respective retracted positions; and
   preshaped stiffening means in said belt halves for curving said halves about the waist of the seat occupant as said halves are ejected from said retracted positions such that said coupling means collide and automatically couple.

4. An improved seat belt arrangement comprising:
   a seat belt having two halves anchored respectively to the structure of the vehicle and adapted to fit about the waist of the seat occupant with the free ends of the two belt halves releaseably coupled together;
   said seat belt halves having retracted positions within the vehicle structure to provide a substantially clear seat;
   means for ejecting the seat belt halves from their respective retracted positions, said ejection means including power means and ejection tubes;
   buckling means carried by the respective two belt halves adapted to automatically couple upon engagement; and
   said seat belt halves being respectively formed to take a path upon ejection about the waist of the seat occupant and having a fabric structure with an elongated, preshaped stiffening stave located therein.

5. An improved seat belt arrangement in accordance with claim 4 wherein the preshaped stiffening staves are made of steel.

6. An improved seat belt arrangement in accordance with claim 5 wherein means are provided for automatically de-energizing said power means upon engagement and coupling of said coupling means.

7. An improved seat belt arrangement in accordance with claim 4 wherein means are provided for energizing the power means for ejecting the seat belt halves upon closing of the ignition switch of the vehicle.

References Cited

UNITED STATES PATENTS

| | | | |
|---|---|---|---|
| 2,488,858 | 11/1949 | Franz | 297—388 |
| 3,016,206 | 1/1962 | Cone | 242—54 |
| 3,172,700 | 3/1965 | Haas | 297—388 |
| 3,182,923 | 5/1965 | Botar | 280—150 X |
| 3,190,694 | 6/1965 | Isaac | 297—388 |

FOREIGN PATENTS 1,125,097   7/1956   France.

KENNETH H. BETTS, *Primary Examiner.*